United States Patent
Byeon et al.

(10) Patent No.: US 7,761,121 B2
(45) Date of Patent: Jul. 20, 2010

(54) METHODS FOR SHARING MUSIC AND ENABLING CHARACTER COOPERATION IN A WIRELESS LOCAL AREA COMMUNICATION NETWORK

(75) Inventors: Hee-Soo Byeon, Goyang-si (KR); Nho-Kyung Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 1035 days.

(21) Appl. No.: 11/489,193

(22) Filed: Jul. 19, 2006

(65) Prior Publication Data
US 2007/0021142 A1 Jan. 25, 2007

(30) Foreign Application Priority Data
Jul. 25, 2005 (KR) .................. 10-2005-0067422

(51) Int. Cl.
*H04B 1/38* (2006.01)
(52) U.S. Cl. .................. 455/566; 455/550.1; 455/41.2; 345/2.2
(58) Field of Classification Search ............. 455/550.1, 455/41.2, 426.1, 552.1, 566, 556.2; 370/310, 370/328, 338; 345/156, 2.2; 348/14.01–14.02, 348/14.07
See application file for complete search history.

(56) References Cited

U.S. PATENT DOCUMENTS

| | | | |
|---|---|---|---|
| 2005/0202385 A1* | 9/2005 | Coward et al. | 434/307 R |
| 2006/0008256 A1* | 1/2006 | Khedouri et al. | 386/124 |
| 2006/0064276 A1* | 3/2006 | Ren et al. | 702/160 |

FOREIGN PATENT DOCUMENTS

KR 10-2001-0097867 11/2001

\* cited by examiner

*Primary Examiner*—Kamran Afshar
(74) *Attorney, Agent, or Firm*—The Farrell Law Firm, LLP

(57) ABSTRACT

A mobile communication terminal which senses a counterpart mobile communication terminal located within a predetermined range by using local area communication and displays a character corresponding to the sensed counterpart mobile communication terminal on its screen. After character cooperation, the mobile communication terminal transmits reproduced music or a user's spoken comment to counterpart mobile communication terminals by using the local area communication. Also, the mobile communication terminal outputs a sound signal transmitted from a counterpart mobile communication terminal by using the local area communication. Therefore, mobile communication terminals can share music with each other, so that the users can enjoy various types of communication by forming a virtual community space.

20 Claims, 6 Drawing Sheets

METHODS FOR SHARING MUSIC AND ENABLING CHARACTER COOPERATION IN A WIRELESS LOCAL AREA COMMUNICATION NETWORK

PRIORITY

This application claims priority under 35 U.S.C. 119 of an application entitled "Methods For Sharing Music and Enabling Character Cooperation And Mobile Communication Terminal For Performing The Same" filed in the Korean Intellectual Property Office on Jul. 25, 2005 and assigned Serial No. 2005-67422, the contents of which are incorporated herein by reference.

BACKGROUND OF THE INVENTION

1. Field of the Invention

The present invention relates to a method for sharing music and a mobile communication terminal for performing the same.

2. Description of the Related Art

Recently, mobile communication terminals such as personal digital assistants (PDA), which can be easily carried by a person, have been widely popularized. With the development of communication technology, it becomes possible for the mobile communication terminal to provide supplementary functions such as game, alarm and MP3 player functions using various images and sound, in addition to the communication functions such as a call function and a short message service (SMS) function. Accordingly, the user of the mobile communication terminal can use the various convenient services, as well as the basic communication functions.

Generally, a mobile communication terminal is provided to enable a user to communicate with a counterpart located at a position too far from the user to directly meet and talk with each other. Recently, the mobile communication terminals have been designed to enable local area communication, so that the mobile communication terminals are equipped with various functions suitable for the local area communication.

SUMMARY OF THE INVENTION

An object of the present invention is to provide a mobile communication terminal and a method capable of achieving character cooperation or sharing music with other mobile communication terminals by using local area communication.

To accomplish this object, in accordance with one aspect of the present invention, there is provided a mobile communication terminal including a memory for storing at least one of images and moving pictures of at least one character corresponding to a character identity code; a local area communication module for enabling the mobile communication terminal to local area communicate with another mobile communication terminal; and a control unit for sensing whether there is another mobile communication terminal within a predetermined range by using the local area communication, and displaying a character corresponding to a sensed mobile communication terminal on a screen.

In accordance with another aspect of the present invention, there is provided a mobile communication terminal including a local area communication module for enabling the mobile communication terminal to local area communicate with another mobile communication terminal; and a control unit for sensing whether there is another mobile communication terminal within a predetermined range by using the local area communication, and transmitting reproduced music and/or a user's sound comment to the sensed mobile communication terminals when the music is reproduced or the user's sound comment is generated by a user of the mobile communication terminal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments according to the present invention will be described with reference to the accompanying drawings. In the following description of the embodiments of the present invention, a detailed description of known functions and configurations incorporated herein will be omitted when it may obscure the subject matter of the present invention.

A mobile communication terminal according to an embodiment of the present invention senses whether there is another mobile communication terminal within a predetermined range by using local area communication, and displays a character corresponding to a sensed mobile communication terminal on a screen. The mobile communication terminal displays its own character together with a counterpart character for another mobile communication terminal, thereby achieving character cooperation.

According to another embodiment of the present invention, after a mobile communication terminal senses another mobile communication terminal, the mobile communication terminal may transmit music reproduced by the mobile communication terminal or a user's spoken comments to the sensed mobile communication terminal by using the local area communication. Also, the mobile communication terminal may output a sound signal transmitted from another mobile communication terminal by using the local area communication.

When a mobile communication terminal either transmits a sound signal to another mobile communication terminal or outputs a sound signal transmitted from another mobile communication terminal, the mobile communication terminal displays a screen for sharing music (hereinafter, referred to as "music-sharing screen"). The music-sharing screen refers to a screen displaying information about a sound signal.

As described above, when a mobile communication terminal senses another mobile communication terminal by using the local area communication, the mobile communication terminal displays a character representing the sensed mobile communication terminal or shares music with the sensed mobile communication terminal, so that the users can enjoy various communication exchanges by forming a virtual community space.

Figure 1:
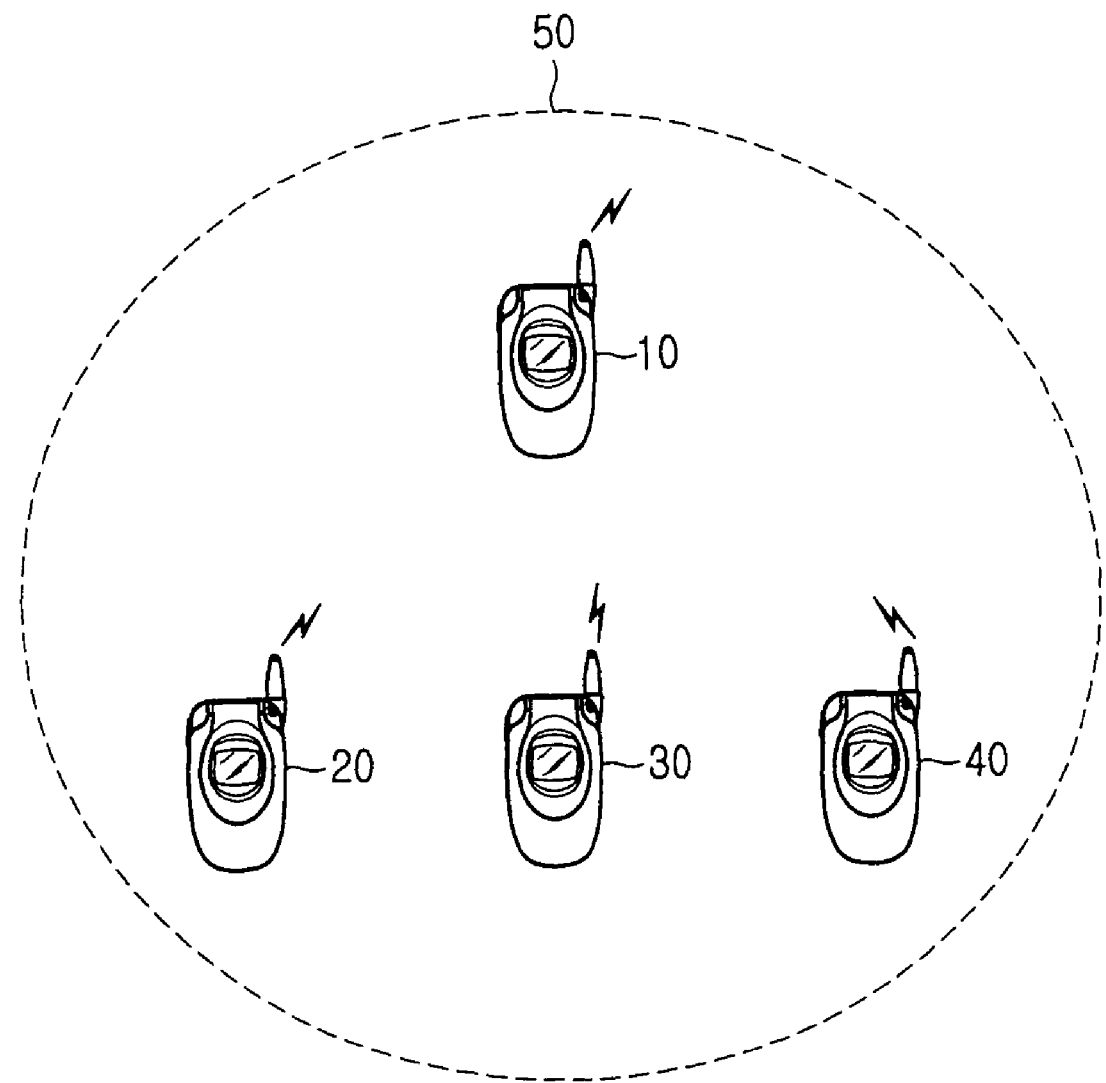
FIG. 1 is a diagram for explaining local area wireless communication among mobile communication terminals containing a local area communication module according to an embodiment of the present invention.

FIG. 1 is a diagram for explaining local area wireless communication among mobile communication terminals containing a local area communication module according to an embodiment of the present invention.

Mobile communication terminals 10, 20, 30 and 40 are located within a local area network 50. The mobile communication terminals 10, 20, 30 and 40 can sense each other within the local area network 50. Each of the mobile communication terminals 10, 20, 30 and 40 stores characters corresponding to the other mobile communication terminals, and displays characters corresponding to counterpart mobile communication terminals together with its own character on its screen when sensing the counterpart mobile communication terminals within the local area network 50.

After the character cooperation, each mobile communication terminal 10, 20, 30 or 40 may transmit self-reproduced music or a user's sound comment to the other mobile communication terminals through the local area communication network 50. Also, each mobile communication terminal 10, 20, 30 or 40 receives and outputs a sound signal transmitted from the other mobile communication terminals by using the local area communication.

The configuration of such a mobile communication terminal will now be described with reference to FIG. 2.

Figure 2:
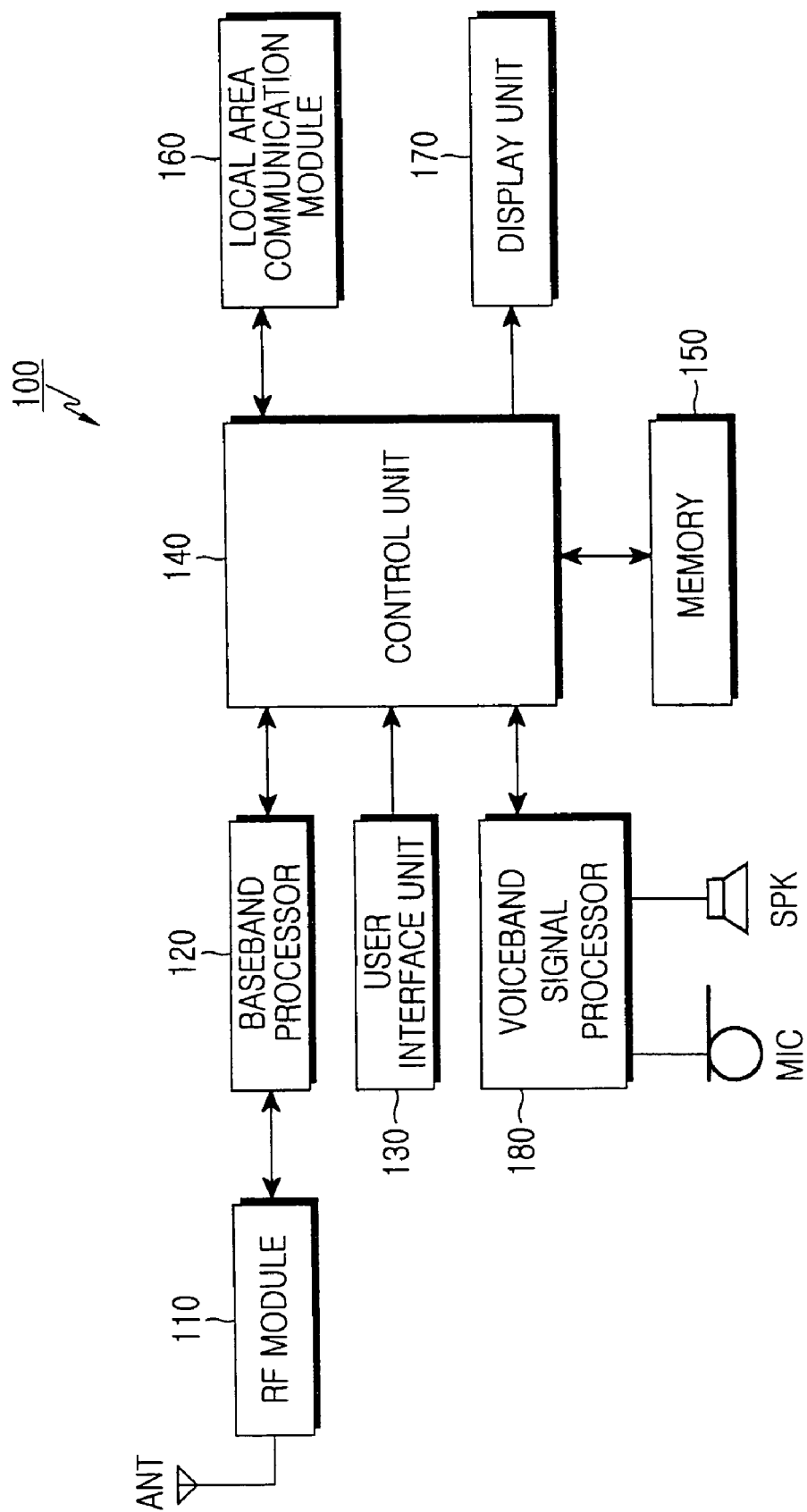
FIG. 2 is a block diagram illustrating the configuration of a mobile communication terminal according to an embodiment of the present invention.

FIG. 2 is a block diagram illustrating the configuration of a mobile communication terminal according to an embodiment of the present invention. A mobile communication terminal 100 according to an embodiment of the present invention includes an RF module 110, a baseband processor 120, a user interface unit 130, a control unit 140, a memory 150, a local area communication module 160, a display unit 170 and a voiceband signal processor 180.

The control unit 140 controls the general operation of the mobile communication terminal 100. In addition, the control unit 140 senses whether another mobile communication terminal, a character of which has been registered in the mobile communication terminal 100, is present within a predetermined range by using the local area network 50.

For instance, such local area communication includes Bluetooth communication, infrared communication or home network communication. The scope of the invention is not to be limited to these local area communications, and it will be understood by those skilled in the art that the present invention can be applied to any network enabling a mobile communication terminal to sense other mobile communication terminals within a predetermined range.

For example, Bluetooth is a standard that is designed to support wireless communication between mobile apparatuses, such as portable PCs and mobile communication terminals, over a small distance. Bluetooth enables various digital apparatuses to exchange voice and data with each other without any physical connection by using radio frequencies. For instance, Bluetooth wireless technology may be employed in a mobile communication terminal and a laptop computer so that they can communicate with each other, even without any physical connection.

When the control unit 140 senses a counterpart mobile communication terminal (one for which a character for which has been registered in the mobile communication terminal 100) to be within a predetermined range, the control unit 140 reads the character identity code corresponding to the sensed counterpart mobile communication terminal. Character identity codes are used to distinguish multiple characters, corresponding to multiple mobile communication terminals, from each other. That is, the character identity codes are stored to correspond to registered counterpart mobile communication terminals. When the control unit 140 senses a counterpart mobile communication terminal, the control unit 140 can read the character for the counterpart mobile communication terminal by using the character identity code corresponding to the counterpart mobile communication terminal.

The memory 150 stores images or moving pictures for various characters corresponding to character identity codes and stores various background images or moving pictures. Also, the memory 150 stores a plurality of music files. In addition, the memory 150 may includes a read only memory (ROM), a random access memory (RAM) and a voice memory to store a plurality of programs and data which are required to control the operation of the mobile communication terminal 100.

The control unit 140 reads a character corresponding to the sensed counterpart mobile communication terminal from the memory 150, and displays the read counterpart character on the screen. In this case, the control unit 140 displays its own character together with the counterpart character on the screen, thereby achieving character cooperation.

After the character cooperation, the control unit 140 transmits music reproduced by the mobile communication terminal 100 or a user's spoken comments to the counterpart mobile communication terminal by using local area communication. The music reproduced by the mobile communication terminal 100 may change according to user's selection. For example, if the mobile communication terminal 100 has an MP3 function, the user may select and reproduce an MP3 file desired to be shared, thereby sharing desired music with other mobile communication terminals. The user's spoken comments may be input through a microphone connected to the voiceband signal processor 180. Such a user spoken comment may be input while music is being reproduced. In this case, the mobile communication terminal 100 transmits the comment input by the user together with the reproduced music to other mobile communication terminals.

Meanwhile, when the reproduced music is multi-channel music, the control unit 140 may transmit a sound signal through different channels to each counterpart mobile communication terminal. As a result, the counterpart mobile communication terminals may serve as surround speakers within the local area network.

When transmitting a sound signal to another mobile communication terminal or outputting a sound signal received from another mobile communication terminal, the control unit 140 displays a music-sharing screen. The music-sharing screen visually notifies the user that the mobile communication terminal 100 is in a music-sharing mode. Also, the music-sharing screen may include information about a sound signal. For example, when the music is a popular song, the singer and title of the popular song may be displayed. In addition, the control unit 140 may control the characters displayed on the screen to animate the characters according to a story matching with the music-sharing function. In this case, the control unit 140 may change the background image to be adaptable to the movement or change of the character.

The radio frequency (RF) module 110 transmits/receives RF signals through an antenna to/from a base station. The RF module 110 converts a received RF signal into an intermediate frequency (IF) signal to output the converted IF signal to the baseband processor 120, and converts an IF signal received from the baseband processor 120 into an RF signal to transmit the converted RF signal through the antenna. The baseband processor 120 includes a baseband analog application-specific integrated circuit (ASIC) for providing interface between the control unit 140 and the RF module 110. The baseband processor 120 converts a baseband digital signal received from the control unit 140 into an analog IF signal to transfer the converted analog IF signal to the RF module 110, and converts an analog IF signal received from the RF module 110 into a baseband digital signal to transfer the converted baseband digital signal to the control unit 140.

The voiceband signal processor 180, connected to the control unit 140, is also connected with a microphone and a speaker. When the music-sharing function is performed, the voiceband signal processor 180 converts a comment (i.e., a voice signal) received from the microphone into a data signal to output the data signal to the control unit 140. Therefore, the control unit 140 can transmit a user's spoken comments together with reproduced music through the local area communication module 160 to other mobile communication terminals. Also, the voiceband signal processor 180 converts a sound signal received from the control unit 140 into an audible signal through the speaker and outputs the audible signal.

The local area communication module 160 enables the mobile communication terminal 100 to wirelessly local-area communicate with other mobile communication terminals having a local area communication module.

The user interface unit 130 includes a plurality of numeral keys and function keys, and outputs input data corresponding to a key selected by the user to the control unit 140. Such a user interface unit 130 may generally include a key matrix or touch screen. When the user interface unit 130 includes a touch screen, an input tool such as a stylus pen can be utilized to select and input a plurality of numeral keys, function keys and direction keys displayed on the touch screen.

The display unit 170 displays various messages and information items under the control of the control unit 140. The display unit 170 may include a liquid crystal display (LCD), a thin film transistor (TFT), an organic electroluminescence (EL) device, etc.

Figure 3:
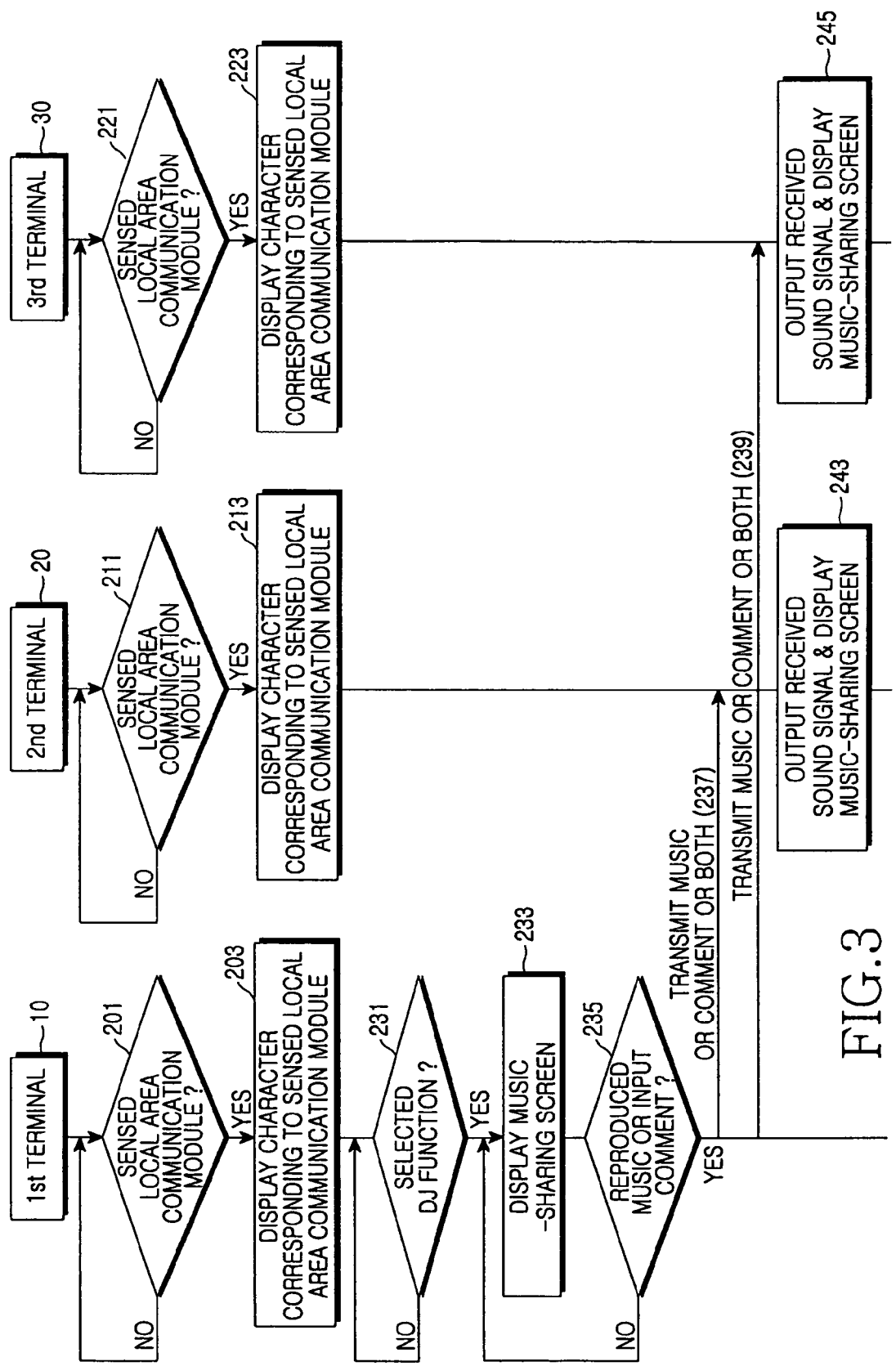
FIG. 3 is a flowchart illustrating a message flow among mobile communication terminals for achieving character cooperation and music sharing according to an embodiment of the present invention.
Figure 4A:
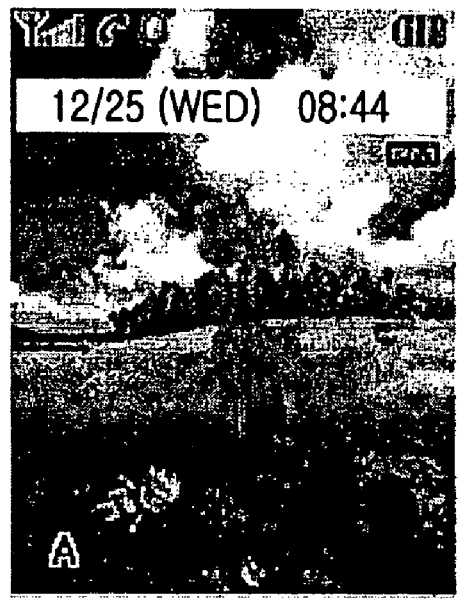
FIGS. 4A to 4D show screen images when characters are displayed on the screen of a mobile communication terminal according to an embodiment of the present invention.
Figure 4B:
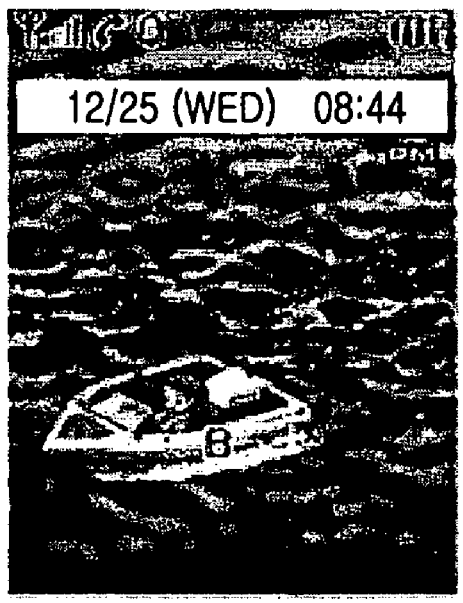
Figure 4C:
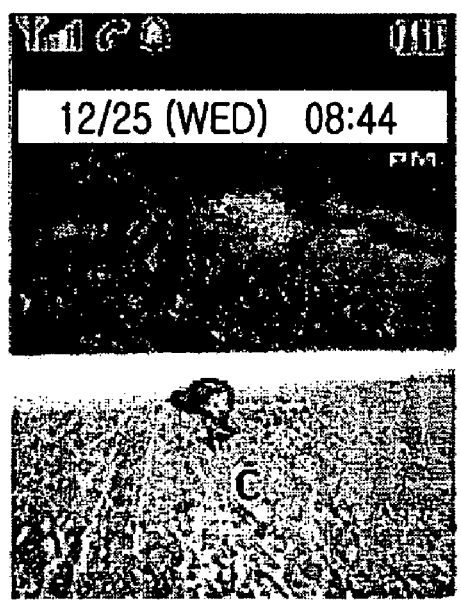
Figure 4D:
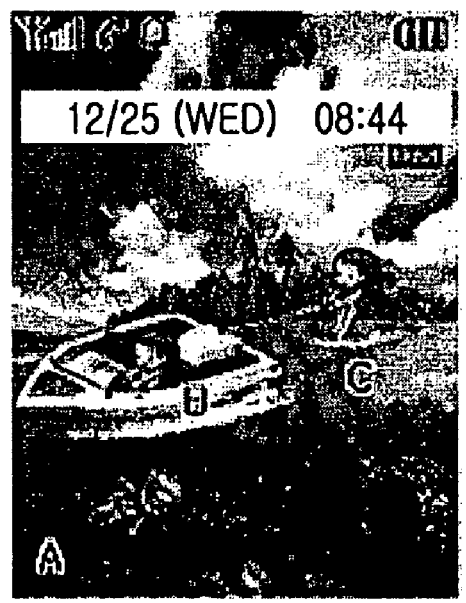
Figure 5A:
FIGS. 5A to 5C show screen images when a music-sharing function is performed in a mobile communication terminal according to an embodiment of the present invention.
Figure 5B:
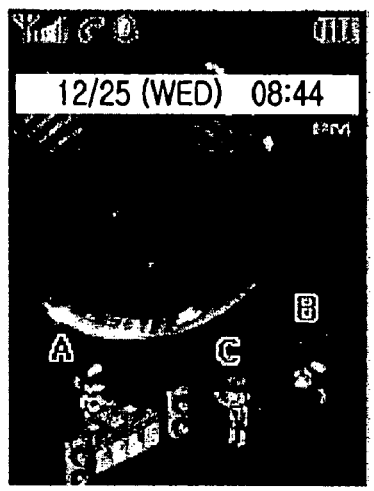
Figure 5C:

FIG. 3 is a flowchart illustrating a message flow among mobile communication terminals for achieving character cooperation and music sharing according to an embodiment of the present invention. FIGS. 4A to 4D show screen images when characters are displayed on the screen of a mobile communication terminal, according to an embodiment of the present invention. FIGS. 5A to 5C show screen images when a music-sharing function is performed in a mobile communication terminal, according to an embodiment of the present invention.

It is assumed that there is a first terminal 10, a second terminal 20 and a third terminal 30 within a local area communication range. Also, it is assumed that the music-sharing function of the terminals 10 to 30 is activated and the terminals 10 to 30 may display their own characters on their screens. Herein, FIG. 4A shows a screen image displayed in the first terminal 10. FIG. 4B shows a screen image displayed in the second terminal 20. FIG. 4C shows a screen image displayed in the third terminal 30.

The first terminal 10 determines if the first terminal 10 senses another local area communication module (step 201). Similarly, each of the second and third terminals 20 and 30 determines if it senses another local area communication module in steps 211 and 221, respectively. When sensing another local area communication module, each of the terminals 10, 20 and 30 displays a character corresponding to the sensed local area communication module on its screen in steps 203, 213 and 223, respectively. Accordingly, the screen of each terminal 10 to 30 may display a common image as shown in FIG. 4D, or at the terminals 10 to 30 can display different images. If different images are displayed, the terminals 10 to 30 may display their characters and characters of other terminals on their screens.

Then, the first terminal 10 determines if a disc jockey (DJ) function is selected by the user (step 231). The DJ function enables a terminal to provide music to other terminals upon music sharing. FIG. 5A shows a displayed screen when the DJ function is selected.

When selecting the DJ function, the first terminal 10 proceeds to step 233, in which the first terminal 10 displays a music-sharing screen as shown in FIG. 5B. The music-sharing screen visually notifies the user that the first terminal 10 is under a music-sharing mode. When the music-sharing screen is displayed through the screen of the first terminal 10, the user of the first terminal 10 reproduces a desired music piece. In this case, the user of the first terminal 10 may add a comment with his voice (user's sound comment) while reproducing the desired music. Therefore, the first terminal 10 determines if music is reproduced and/or if a comment is input by the user (step 235). When music is reproduced and/or a comment is input, the first terminal 10 transmits the music, the comment or both to the second terminal 20 in step 237. At this time, the first terminal 10 proceeds to step 239, in which the first terminal 10 also transmits the music, the comment or both to the third terminal 30.

In this case, the first terminal 10 displays information about the reproduced music as shown in FIG. 5C. As shown in FIG. 5C, when the reproduced music is a popular song, the singer and title of the popular song are displayed. The scope of the invention is not to be limited to such a screen configuration. The music-sharing screen may include various additional music information. According to another embodiment of the present invention, characters displayed on a music-sharing screen in correspondence with terminals may be designed to be displayed or animated according to various stories suitable for musical accompaniment.

When receiving music, a comment or both, the second terminal 20 proceeds to step 243 in which the second terminal 20 outputs the received music or the like and displays a music-sharing screen. Similarly, when receiving the music, spoken comments or both, the third terminal 30 proceeds to step 245 in which the third terminal 30 outputs the received music or the like and displays a music-sharing screen.

Any terminal located within the local area network 50 can have the DJ function. Therefore, when the DJ function of a first terminal is activated while the DJ function of a second terminal is being activated, the first terminal requests a DJ authority from the second terminal being activated. In addition, when the second terminal having the DJ function being currently activated allows the first terminal to have the DJ authority, the terminal having the DJ function being activated is changed. Therefore, multiple terminals located within a local area network can share music with each other.

Figure 6:
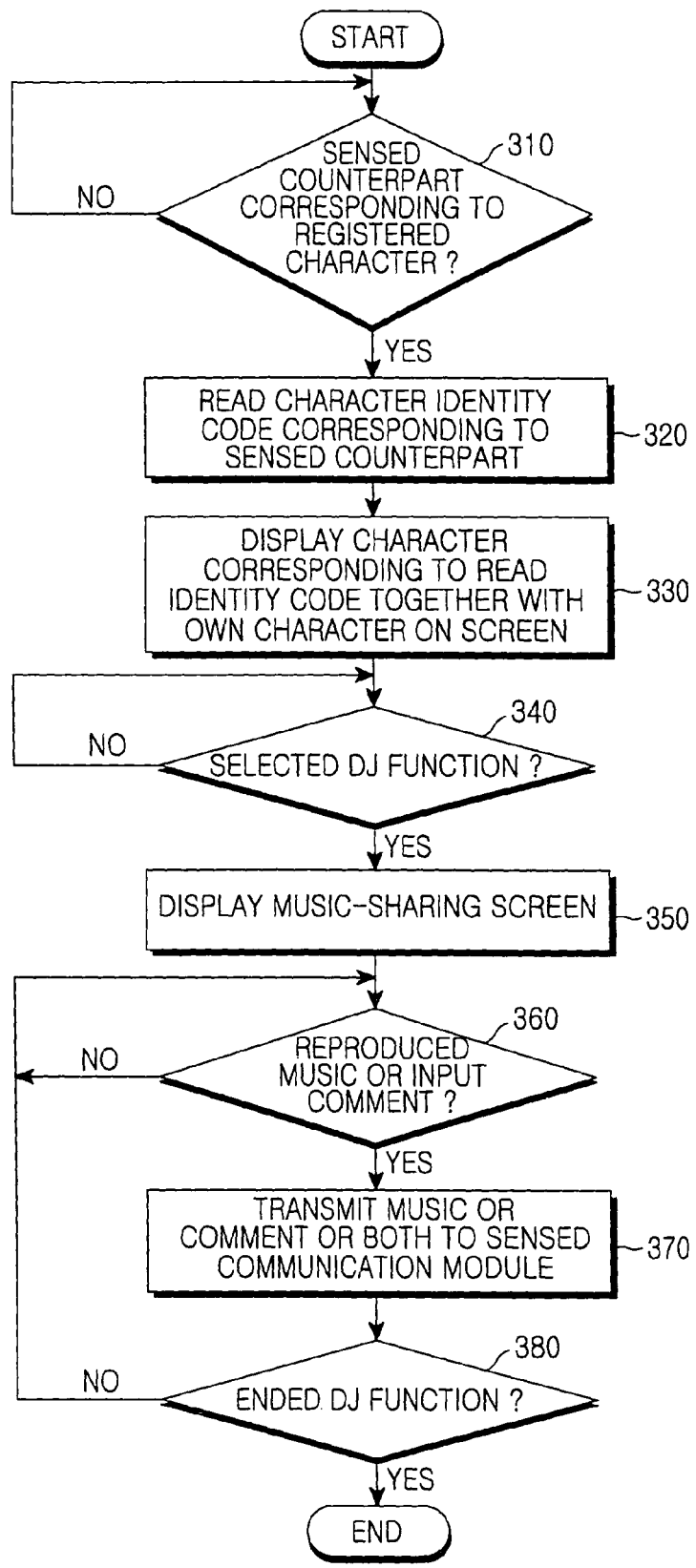
FIG. 6 is a flowchart illustrating a control procedure for performing character cooperation and music-sharing functions in a mobile communication terminal according to an embodiment of the present invention.

FIG. 6 is a flowchart illustrating a control procedure for performing character cooperation and music-sharing functions in a mobile communication terminal according to an embodiment of the present invention.

In step 310, the control unit 140 of a mobile communication terminal determines if the control unit 140 senses a counterpart mobile communication terminal, for which a character has been registered in the mobile communication terminal, within a local area network. As described above, the control unit 140 senses whether there is another mobile communication terminal, for which a character has been registered, within a predetermined range by using the local area network.

When sensing a counterpart mobile communication terminal within the predetermined range, the control unit 140 proceeds to step 320 in which the control unit 140 reads a character identity code corresponding to the sensed counterpart mobile communication terminal. In step 330, the control unit 140 displays the character corresponding to the read character identity code together with its own character on a wait-mode screen, and then proceeds to step 340. FIG. 4D shows a screen of a mobile communication terminal which displays not only its own character but also characters for the other mobile communication terminals.

In step 340, the control unit 140 determines if a DJ function is selected by the user.

When the DJ function is selected by the user, the control unit 140 activates the DJ function, and then proceeds to step 350. As described above, the DJ function enables a terminal to provide music to other terminals upon music sharing. In this case, if a counterpart mobile communication terminal is activating the DJ function, the control unit 140 requests the counterpart mobile communication terminal to give the DJ authority to the mobile communication terminal, and activates the DJ function when the request is approved.

In step 350, the control unit 140 displays a music-sharing screen. As described above, the music-sharing screen visually notifies the user that the mobile communication terminal is under a music-sharing mode. When the user reproduces music or creates a comment in step 360, the control unit 140 transmits the music, the comment or both to the sensed counterpart mobile communication terminal in step 370.

In this case, the control unit 140 may display information about the reproduced music on the screen, and also may animate the characters on the screen according to various stories suitable for accompaniment by the reproduced music.

Although the above embodiments are described with respect to a mobile communication terminal having both character cooperation and music sharing functions, the character cooperation function and the music sharing function may be separately realized.

As described above, according to the present invention, the mobile communication terminals can share music with each other by using a local area network, so that the users can enjoy various communications by forming a virtual community space.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A mobile communication terminal comprising:
   a memory for storing at least one of images and moving pictures of one or more characters, wherein each character corresponds to a character identity code;
   a local area communication module for enabling the mobile communication terminal to local-area communicate with another mobile communication terminal; and
   a control unit for sensing whether there is another mobile communication terminal within a predetermined range by using the local area communication, and displaying on a screen at least one of a character image and a character moving picture from the memory corresponding to a character identity code of a sensed mobile communication terminal.

2. The mobile communication terminal as claimed in claim 1, wherein the control unit transmits at least one of reproduced music and a user's spoken comments to other mobile communication terminals by using the local area communication when there occurs at least one of the music being reproduced and the user's spoken comments being generated by a user of the mobile communication terminal.

3. The mobile communication terminal as claimed in claim 1, wherein the control unit outputs a sound signal transmitted from another mobile communication terminal by using the local area communication.

4. The mobile communication terminal as claimed in claim 1, wherein the control unit reads a character of the character identity code corresponding to the sensed mobile communication terminal from the memory.

5. The mobile communication terminal as claimed in claim 1, wherein the control unit displays a music-sharing screen for visually notifying a user that the mobile communication terminal is under a music-sharing mode, when there occurs at least one of the music being reproduced and a spoken comment being generated from the user.

6. The mobile communication terminal as claimed in claim 5, wherein the control unit controls that the character displayed on the music-sharing screen so as to animate the character according to a story suitable for the music.

7. A mobile communication terminal comprising:
   a local area communication module for enabling the mobile communication terminal to local-area communicate with another mobile communication terminal; and
   a control unit for sensing whether there is another mobile communication terminal within a predetermined range by using the local area communication, and transmitting at least one of reproduced music and a user's spoken comment to sensed mobile communication terminals when there occurs at least one of the music being reproduced and the user's spoken comment being generated by a user of the mobile communication terminal;
   wherein the mobile communication terminal and the sensed mobile communication terminals output the reproduced music simultaneously so that the user of the mobile communication terminal and users of the sensed mobile communication terminals can listen to the reproduced music.

8. The mobile communication terminal as claimed in claim 7, wherein the control unit outputs a sound signal transmitted from another mobile communication terminal by using the local area communication.

9. The mobile communication terminal as claimed in claim 7, further comprising a memory for storing at least one of images and moving pictures of one or more characters, wherein each character corresponds to a character identity code,
   wherein the control unit displays on a screen at least one of a character image and a character moving picture from the memory corresponding to a character identity code of the sensed mobile communication terminal.

10. The mobile communication terminal as claimed in claim 9, wherein the control unit reads a character of the character identity code corresponding to the sensed mobile communication terminal from the memory.

11. The mobile communication terminal as claimed in claim 7, wherein the control unit displays a music-sharing screen for visually notifying a user that the mobile communication terminal is under a music-sharing mode, when there occurs at least one of the music being reproduced and the user's spoken comment being generated.

12. The mobile communication terminal as claimed in claim 11, wherein the control unit controls that the character displayed on the music-sharing screen so as to animate the character according to a story suitable for the music.

13. A method for character cooperation in a mobile communication terminal which includes a memory for storing at least one of images and moving pictures of one or more characters, and a local area communication module for enabling local area communication with a counterpart mobile communication terminal, the method comprising:
   sensing whether there is a counterpart mobile communication terminal within a predetermined range by using the local area communication; and
   displaying on a screen at least one of a character image and a character moving picture from the memory corresponding to a character identification code of the counterpart mobile communication terminal when the counterpart mobile communication terminal is sensed.

14. The method as claimed in claim 13, further comprising transmitting at least one of reproduced music and a user's spoken comment to counterpart mobile communication terminals by using the local area communication when there occurs at least one of the music being reproduced and the spoken comment being generated by a user of the mobile communication terminal.

15. The method as claimed in claim 13, further comprising a step of outputting a sound signal transmitted from a counterpart mobile communication terminal by using the local area communication.

16. The method as claimed in claim 14, further comprising displaying a music-sharing screen for visually notifying the user that the mobile communication terminal is under a music-sharing mode, when there occurs at least one of the music being reproduced and the user's spoken comment being generated.

17. A method for sharing music in a mobile communication terminal which includes a memory for storing at least one of images and moving pictures of at least one character, and a local area communication module for enabling local area communication with a counterpart mobile communication terminal, the method comprising:
   sensing whether there is a counterpart mobile communication terminal within a predetermined range by using the local area communication; and
   transmitting at least one of reproduced music and a user's spoken comment to counterpart mobile communication terminals by using the local area communication when there occurs at least one of the music being reproduced and the spoken comment being generated by a user of the mobile communication terminal;
   wherein the mobile communication terminal and the counterpart mobile communication terminal output the reproduced music simultaneously so that the user of the mobile communication terminal and users of the counterpart mobile communication terminals can listen to the reproduced music.

18. The method as claimed in claim 17, further comprising displaying the character corresponding to the sensed counterpart mobile communication terminal on a screen.

19. The method as claimed in claim 17, further comprising outputting a sound signal received from a counterpart mobile communication terminal by using the local area communication.

20. The method as claimed in claim 17, further comprising displaying a music-sharing screen for visually notifying a user that the mobile communication terminal under a music-sharing mode, when there occurs at least one of the music being reproduced and the user's spoken comment being generated.

* * * * *